Jan. 6, 1953          E. L. STRAUB          2,624,284
FUEL INJECTOR FOR INTERNAL-COMBUSTION ENGINES
Filed Aug. 4, 1947          4 Sheets-Sheet 1

INVENTOR
Edward L. Straub
BY
Robt. S. Woolsey
HIS ATTY

Jan. 6, 1953  E. L. STRAUB  2,624,284
FUEL INJECTOR FOR INTERNAL-COMBUSTION ENGINES
Filed Aug. 4, 1947  4 Sheets-Sheet 2

INVENTOR.
Edward L. Straub
BY

Jan. 6, 1953　　　　　E. L. STRAUB　　　　　2,624,284
FUEL INJECTOR FOR INTERNAL-COMBUSTION ENGINES
Filed Aug. 4, 1947　　　　　　　　　　　　　　4 Sheets-Sheet 4
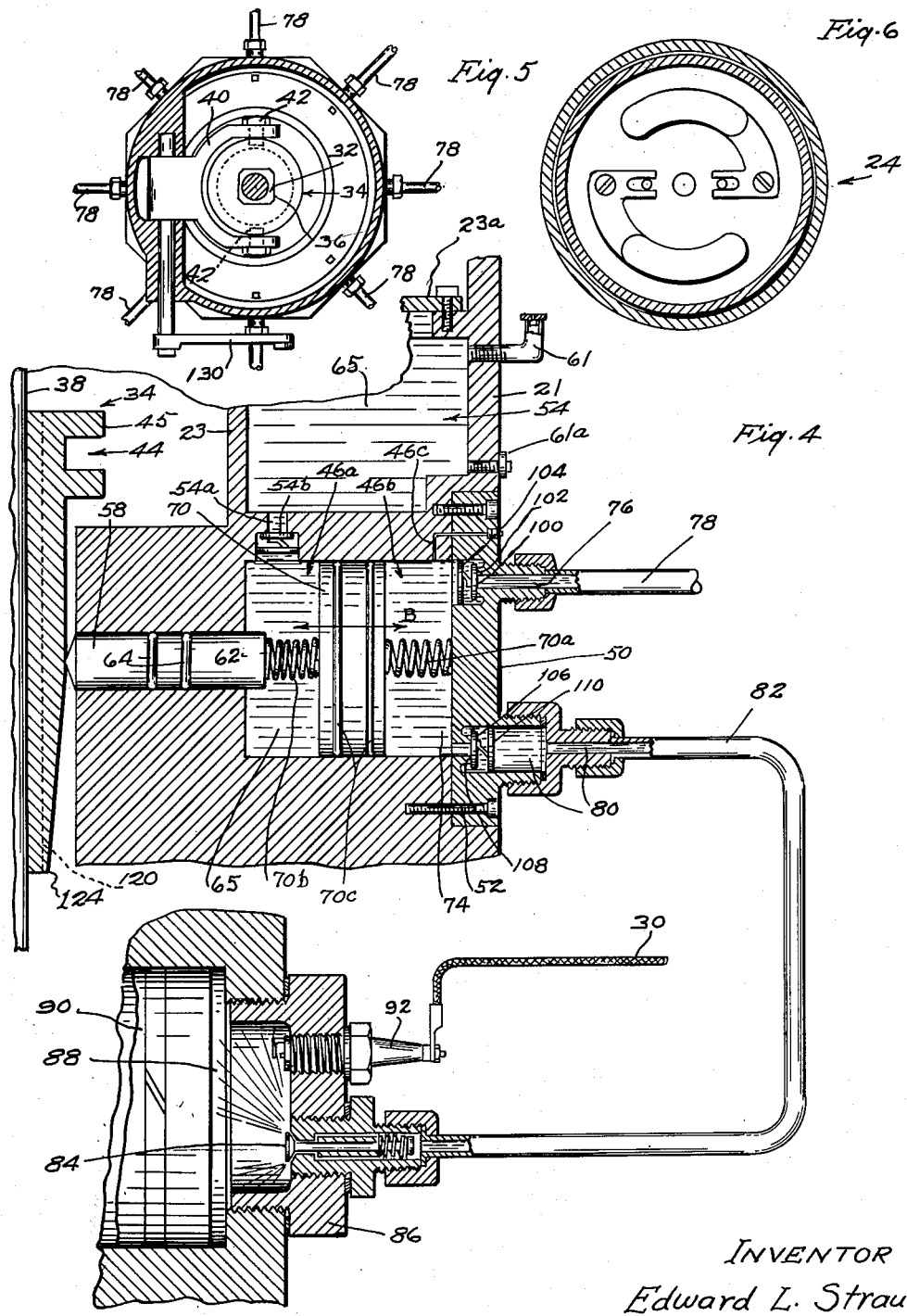
INVENTOR
Edward L. Straub Patented Jan. 6, 1953

2,624,284

UNITED STATES PATENT OFFICE 2,624,284

FUEL INJECTOR FOR INTERNAL-COMBUSTION ENGINES

Edward L. Straub, North Hollywood, Calif.

Application August 4, 1947, Serial No. 765,931

9 Claims. (Cl. 103—44)

The fuel injector of this invention is primarily designed to be used in cooperation with an electrical ignition system adapted to ignite fuel forced in measured quantity into the combustion chamber of an engine, although it will be apparent that subject to minor modification, the injector can be used with equal facility to force metered quantities of relatively heavy oil into engines of the diesel type.

Internal combustion engines using a highly volatile fuel, such as gasoline, are provided with carburetors to regulate the rate of fuel input and to atomize the liquid fuel, whereby upon entering the intake manifold and combustion chamber, the fuel is more readily volatilized for rapid combustion. Carburetors have long been used for the above stated purposes and are currently so used for the prime reason that there is no practical injector available at the present time for handling highly volatile fuel.

Accordingly, in view of the preceding statement of fact, it is a prime object of the invention to provide a simple, reliable, efficient, and relatively low cost injector for highly volatile motor fuels.

An advantage of the invention resides in the fact that fuel to be injected is sealed from atmospheric contact whereby danger of accidental fire due to an open flame or spark is obviated, also the device of this invention will functionally operate under water or conditions of water splash not heretofore obtainable in a fuel servicing device adapted to handle highly volatile fuels.

Another advantage of the device resides in the fact that fire hazard due to back-flash caused by faulty ignition and/or timing is impossible, there being no chamber or other cavity within which fuel could become preignited.

A further advantage of the invention resides in ability to quickly and easily install the device upon any internal combustion engine having a cam driven ignition-distributor system thereon.

A still further advantage of the injector resides in the reliability and uniformity of feed due to absence of parts liable to breakage and/or rupture, there being no element or part of the device which is subject to flexing or other abnormalcy of direct mechanical application.

The foregoing and other objects, features, and advantages of the invention may be noted from the following specification, the subjoined claims, and the accompanying drawing.

In the drawing:

Figure 4 is a detailed view showing one of the injector units and also showing one means of injecting the fuel into the combustion chamber of an internal combustion engine, including ignition means to fire the injected fuel.

Figure 5 is a sectional view taken along line 5—5, Figure 2 showing the control (manual) used to vary the position of the cam and hence the amount of fuel injected per each actuation thereof during any given position of the cam.

Figure 6 is a view taken along line 6—6, Figure 2, showing construction of a portion of the distributor.

Figure 1:
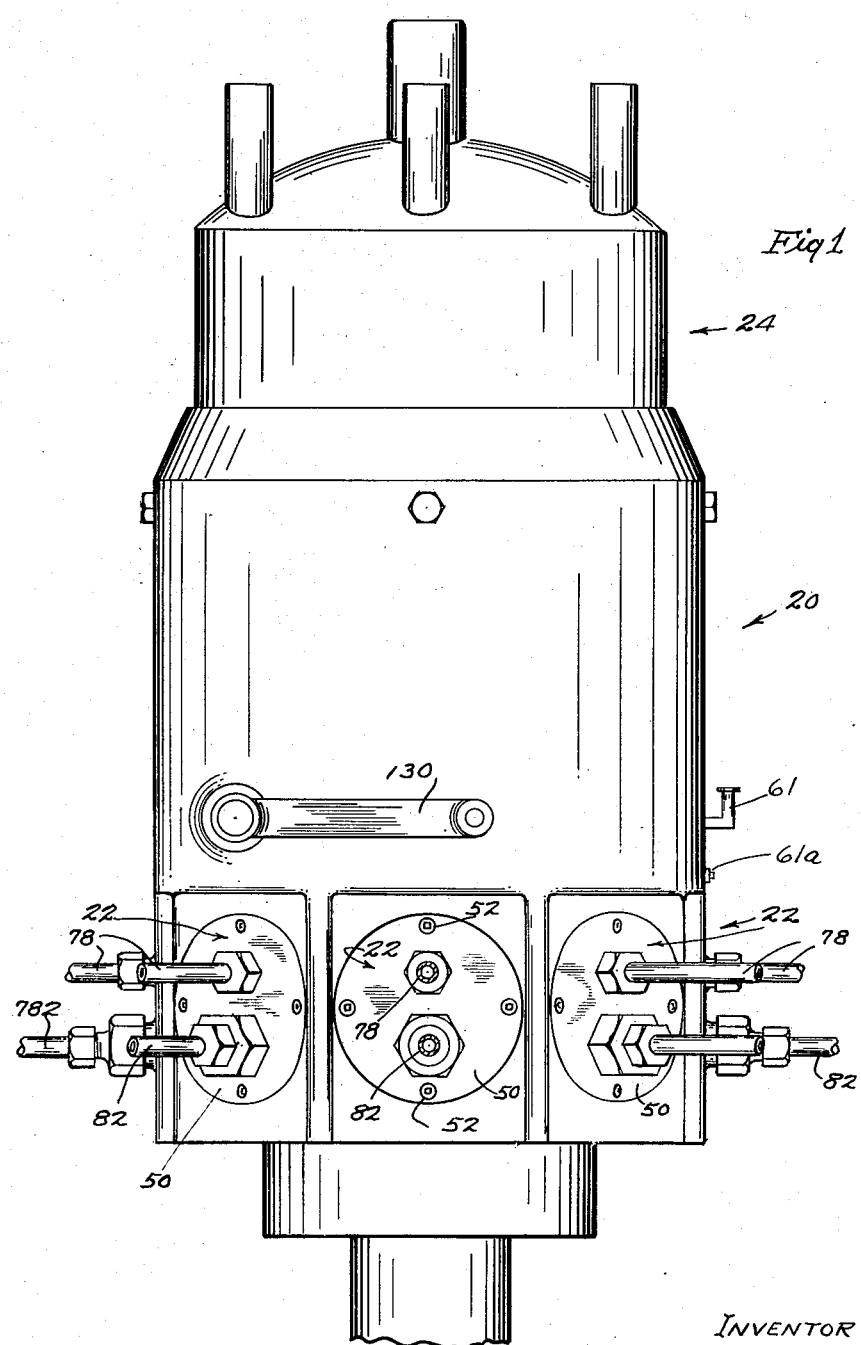
Figure 1 is a side-elevational view showing the fuel injector of this invention, grouped in multiple number and positioned within a housing unit which as a complimentary element includes an electrical distributor of conventional type.

In the drawing the reference character 20 indicates a housing structure within which the several fuel injector units 22 are situated and of which there are eight in the present illustration, as well as the housing for an electrical distributor 24.

Situated in the medial vertical center of the housing 20, I place a shaft 26 which is actuated in timed sequence by means of a geared relationship with the cam-shaft (not shown) of the engine upon which the injector is mounted. The shaft 26 is provided with a tubular driving element 38 the exterior surface of which is rectangular as shown at 32 in Figure 5, and this arrangement is had to establish a positive drive for a cam unit 34 having a similarly shaped longitudinal bore 36, although it is recognized that a splined, or other serrated configuration could be employed between the cam 34 and the element 38 so long as unfailing rotation of the cam is effected while at the same time enabling the cam to be moved longitudinally of the element 38 in response to manual pressure, or pressure exerted by an automatic governor upon the yoke 40 operatively connected to the cam 34 by means of studs 42 within the annular groove 44 in the upper end of the cam, whereby the cam may be variably positioned vertically upon the element 38 while concurrently being rotated thereby.

In the present instance, I have shown eight of the fuel injector units 22, all of which are repetitious of one another and any one of which is adapted to service a single power cylinder as indicated in Figure 4.

The injector units 22 are located in a common plane extending across the housing 20 and radially from the medial vertical center of the shaft 26, and now with reference to a single injector unit.

The housing 20 is formed with axially aligned bores 44, 46, and 48, of which bores, bore 48 is adapted to receive a cover-plate 50 secured in place by means of screws 52, and which plate is adapted to close the otherwise open end of the bore 46.

Each of the bores 46 are in valved communication with a reservoir 54 positioned above the bores 44 and 46 and is generally defined by the outer wall 21 of the housing 20, an inner annular wall 23 and a cover-plate 23a.

A floating piston 70 is placed centrally of the length of each bore 46, thereby creating chambers 46a and 46b upon each side of the piston, into one of which chambers the piston is free to move for positional self-accommodation therein upon loss of fluid therein and into the other thereof upon valved release of fluid therein. An extensile spring 70a is placed longitudinally of the chamber 46b, the one end of the spring being in pressure contact with the adjacent side of the piston 70, while the other of the ends thereof is in pressure contact with the inner face of the cover plate 50. A similar extensile spring 70b extends longitudinally of the chamber 46a and is in pressure contact with the opposite face of the piston 70, while the other of the ends of spring 70b is in pressure abutment with the outer end face of a plunger 58.

As reference to the several figures of the drawing will show, the plunger 58 is slightly longer than the bore 44 within which it is functionally operable. When in non-functioning position, the inner end of the plunger is in surface contact with the cylindrical surface of the cam unit 34 while the other end of the plunger is flush with the adjacent end wall of the chamber 46a. Rotation of the cam unit causes the cam surface 126 to pass under the end of the plunger and effect periodic outward movement thereof whereby the outer end of the plunger enters the chamber 46a to displace a quantity of fluid 65 and thereby, as will be more particularly described, effect functional operation of the injector unit as a whole.

Packing rings 64 placed in grooves formed in the plunger 58 minimize waste of fluid 65 past the plunger in the bore 44, and likewise packing rings 70c upon the piston 70 effectively seal-off and prevent intermingling of the fluid 65, which is preferably a lubricant, with the liquid fuel 74 in the chamber 46b.

The cover-plate 50 is formed with a fuel inlet 76 through which fuel 74 passes from the supply line or pipe 78 to the variable capacity fuel chamber 46b located between the outer face of the disc 70 and the inner face of the cover-plate 50, and is also provided with a fuel outlet 80 through which fuel passes from the chamber 46b to the pipe 82, and thence to a suitable spray jet 84 positioned in an adaptor 86 or equivalent thereof, whereby fuel is delivered in atomized form to a combustion chamber 88, at which point the fuel is ignited, under compression by the piston 90, by reason of a conventional high tension ignition system as exemplified by the spark plug 92, the lead 30, and the distributor 24.

An inlet valve 100 is held upon the valve seat 102 by means of a spring 104 and is adapted to prevent expulsion of fuel from the variable capacity chamber 46b during the power or fuel expelling stroke of the plunger 58, and likewise an outlet valve 106 is held upon the valve seat 108 by means of a spring 110, and is adapted to prevent drawing fuel from the line 82 during the suction stroke of the plunger 58.

Operation of the injector over a period of time will cause a quantity of the fluid 65 to be wasted from the bore 46, hence means must be provided to facilitate replenishment or maintenance of a supply thereof, and to this end I have provided the reservoir 54 which is in communication with each of the chambers 46a through the passageway 54a and the check valve 54b, whereby outward surging of fluid to the reservoir is prevented on either stroke of the plunger 58.

Figure 2:
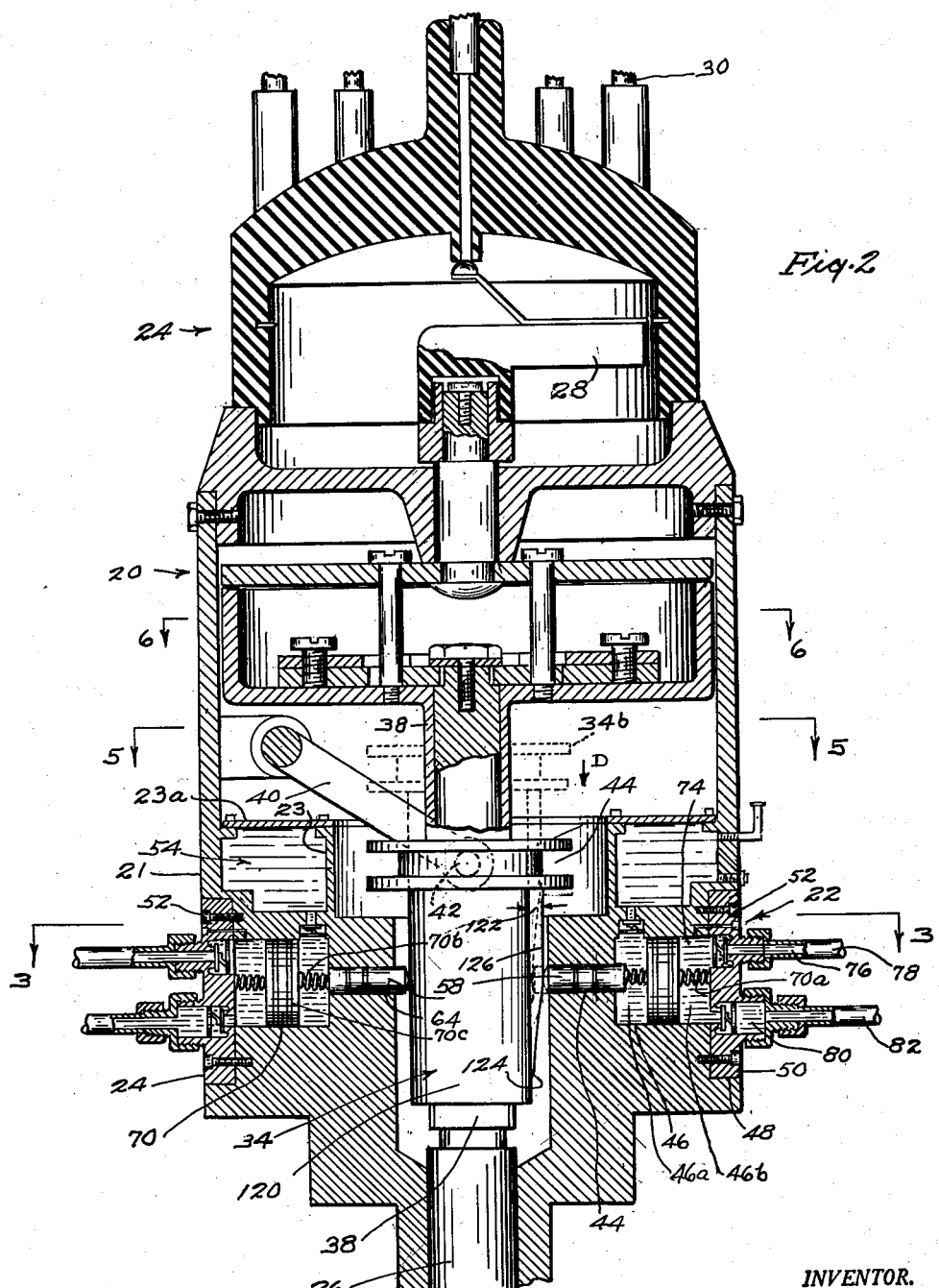
Figure 2 is a mid-vertical sectional view showing general arrangement of the fuel injector within its housing and its co-related position with respect to power driven cam used to actuate it, the view also shows the general environment and relation of the distributor to the injectors and the driven shaft for the distributor and injector.
Figure 3:
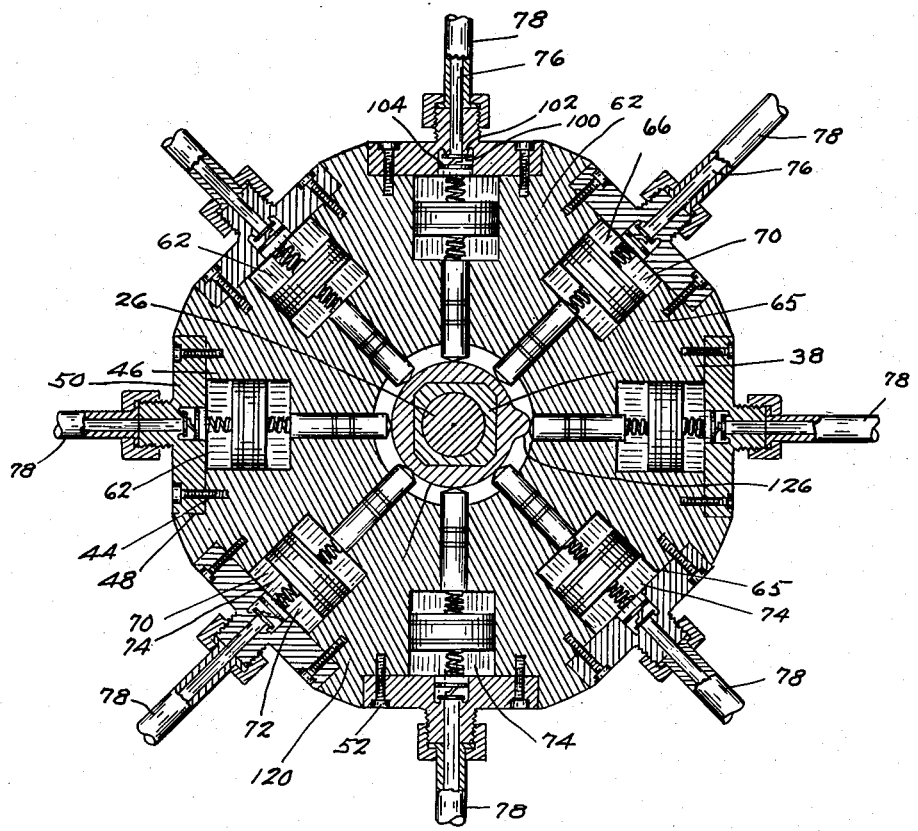
Figure 3 is a transverse sectional view, part of the injector unit being shown in section and part thereof in top-plan, the view is well adapted to show general arrangement of construction of the injector in multiple number.

Reference has been made to the plunger 58 and the motion imparted thereto by the cam surface 126. As will be noted by reference to the drawing, the cam unit 34 comprises an elongated sleeve-like device which is formed with an exterior cylindrical surface 120 which is coextensive with the circumference thereof, except for a single longitudinally extending rib-like cam 126 which extends from a point of maximum altitude 122 (Figure 2) adjacent the flanged end 45 and the groove 44 therein, to a point 124 of substantial merger with the cylindrical surface 120 of the unit 34. The length of the cam surface 126 is such as to permit outward movement of the plunger 58 in increments of a total movement which are so graduated as to enable a smooth and gradual increase or decrease of plunger movement to be had, and which increase or decrease in movement of the plunger is reflected in a smooth uninterrupted acceleration or de-acceleration of power depending upon whether the altitude of the cam is being increased or decreased at the point of intersection with the plunger 58.

The preceding statement covers the physical structure involved in this invention, a description of the function and operation of the several co-related parts, and of the unit as a whole will now be set forth. Excepting as to the distributor 24, which generally speaking may be of any standard type, the operation of which in connection with internal combustion engines is generally understood.

After having assembled the device in substantially the form shown in the several figures of the drawing, and after mounting the same upon and synchronizing the same with respect to the piston and valve motion of the engine associated therewith, and after filling the reservoir and that portion of the bore 46a which lies between the plunger 58 and the floating piston 70 with such a fluid as a light weight lubricating oil 65 through the inlet 61, and after having filled the chamber 46b and all supply lines connected therewith with fuel 74, and further, after having set the accelerator or cam control lever 130 in idling position, that is in position to raise the cam unit 34 to dotted line position 34b, it is only necessary to initially start the engine with which the injector is associated by such means as an electric starter of conventional form.

The impetus thus given the engine will rotate the shaft 26 and the sleeve 38 thereon, causing the cam unit 34 to rotate about the axis of the shaft 26. As aforementioned, at this time the position of the control lever 130 and the yoke 40 would be such as to raise the cam unit to the position shown in dotted lines 34b, and in which position the cam 126 applies a minimum thrust to the plunger 58 and is in effect the engine idling position.

Each time the cam is rotated, the plunger 58 is partially thrust into the chamber 46a, thereby displacing a quantity of fluid 65 which is equal to the mass of the plunger inserted therein, and since the displaced fluid cannot escape through the valve 54b, relief is had by forcing the piston 70 in the direction of the arrow B (Figure 4), and thereby displacing an equal volume of fuel 14 from the chamber 46b, the ejected fuel flowing into the line 82 and thence to the spray jet 84 and the combustion chamber 88, where it is ignited in the manner usual to electrically fired internal combustion engines.

During this period the springs 70a and 70b, which are calibrated for substantial equality of compressibility and reaction to compression, are brought into full play, and serve the dual function of, first, causing the plunger to follow the cam after power thrust and thereby effecting or causing the suction stroke or inward movement of the plunger to draw a quantity of fuel into the chamber 46b, and secondly, cause the disc 70 to remain substantially centered within the bore 46, the exact position thereof being a matter of equilibrium maintained by the springs in their paired thrusting and resisting strengths, for it is to be noted that both the fluid 65 and the fuel 74 are under atmospheric pressure only, hence of themselves do not cause an unbalanced condition of pressure to be exerted upon the piston 70.

Loss of fluid 65 past the plunger 58 would cause a momentary void to exist in the chamber 46a which would be compensated for by adjustment of the position of the piston 70 operating under the combined influence of the spring 70a and atmospheric pressure until a condition was reached wherein atmospheric pressure operating upon the valve 54b is sufficient to effect opening thereof to admit a necessary quantity of fluid 65 to enter the chamber 46a, whereupon the piston 70 again attains a point of equilibrium between the springs 70a and 70b.

Since the cam 126 increases in throw as it is moved longitudinally of its axis in the direction of the arrow D, it is obvious that such movement will increase the volume of fuel delivered to the jet 84 by reason of greater lineal travel imparted to the plunger 58, and hence of displacement of fluid 65 effected, and of fuel ejected thereby, and in this manner an engine may be serviced with fuel in proportion to power requirements.

It is to be noted that the fluid 65 serves not only as a hydraulic ram to move the piston 70 in proportion to fluid displacement effected by intrusion of the plunger 58, but that it also serves to effect an equalized pressure upon the face of the piston whereby the motion thereof is always and entirely in alignment with the bore 46, hence the piston is free to reciprocate back and forth in the bore 46 in response to movement of the plunger 58 without danger of binding or lodging.

Loss of fluid 65 by waste has no adverse functional effect upon the ejector because of functional operation of the reservoir 54. Loss of all of the fluid 65 would only act to stop injection of fuel to the motor pending re-servicing thereof with the fluid.

From the preceding description it might appear that functionally the piston 70 is analogous to a diaphragm, yet such is not the case, for in a diaphragm pump the fluid moved is controlled by a fixed pulsation thereof, whereas in the instant case, the fuel moved is proportional to displacement of fluid effected by the plunger 58 which may be constant, or constantly varying as desired. In the present instance the piston acts as a self-adjusting curtain or barrier between two functionally incompatible fluids, the one being used to apply an equalized expelling pressure upon the other and this service is limited only by the durability of the packing rings which in practice have been found to be long lived, but regardless thereof, are quickly and easily replaced at nominal cost.

As in the case of any piece of apparatus, periodic inspection is desirable and necessary, and in the present instance such inspection is largely limited to the level of the fluid 65 in the reservoir 54, and is made by removal of the screw plug 61a. If fluid flows therefrom, there is an ample reserve of fluid below this level, otherwise it may be necessary to refill the reservoir 54 and this is accomplished by adding fluid through the inlet 61, whereupon the injector is ready for further service.

Having thus described my invention in its presently preferred form, that which I declare to be new and which I desire to protect by Letters Patent, is:

1. In a fuel injector for an internal combustion engine including a body structure therefor, a plural number of diametrically differentiated aligned bores in the body structure, a fluid displacement plunger reciprocable in the smaller of said bores, a cover plate associated with the greater of said bores in closure of one end of the intermediate one of said bores and a non-extensible disc positioned within and adapted to float substantially the length of the intermediate bore to an operational locus and so as to form a variable capacity chamber upon each side thereof, valved ports in said cover plate adapted to control flow of liquid fuel to and from one of said chambers, a valved port adapted to atmospheric pressure actuated operation to admit a different liquid to the other of said chambers, and resilient stabilizers upon each side of said disc, one of said stabilizers being in pressure contact with an end of said plunger and the adjacent face of said disc and the other of said stabilizers being in pressure contact with the inner face of said cover plate and an adjacent face of said disc, and power means to reciprocate said plunger.

2. The structure as defined in claim 1 in which said disc is shiftable longitudinally in its bore upon diminishment of fluid upon one of the sides thereof.

3. The structure defined in claim 1 in which said disc is shiftable to a subsequent operational position longitudinally in its bore upon diminishment of fluid upon either of the sides thereof.

4. The structure defined in claim 1 in which said disc is unilaterally shiftable longitudinally of its bore in direct proportion to expulsion of said liquid fuel therefrom.

5. The structure as defined in claim 1 in which said chambers are maintained in volumetric balance by atmospheric pressure.

6. The structure as defined in claim 1 in which certain of the mentioned valves are operable under atmospheric pressure and another thereof is operable under a power impulse.

7. The structure as defined in claim 1 in which certain of the mentioned valves are operable under atmospheric pressure and another thereof is operable under a power impulse, said disc being shiftable concurrently with movement of the last mentioned valve.

8. The structure as defined in claim 1 in which certain of the mentioned valves are operable under atmospheric pressure and another of said valves is operable to effect discharge of liquid fuel under a power impulse said disc being non-distortably shifted concurrently with operation of the last mentioned valve.

9. The structure as defined in claim 1 in which said disc is bi-laterally shiftable under stabilizer pressure upon wastage of fluid upon either of the sides thereof.

EDWARD L. STRAUB.

REFERENCES CITED

The following references are of record in the file of this patent:

UNITED STATES PATENTS

| Number | Name | Date |
|---|---|---|
| 862,867 | Eggleston | Aug. 6, 1907 |
| 1,101,266 | Franklin | June 23, 1914 |
| 1,377,895 | Long | May 10, 1921 |
| 1,764,712 | Brackett et al. | June 17, 1930 |
| 1,788,886 | Nutt | Jan. 13, 1931 |
| 2,371,054 | Le Clair | Mar. 6, 1945 |
| 2,393,175 | Laskey | Jan. 15, 1946 |